(12) United States Patent
Wang et al.

(10) Patent No.: US 12,486,306 B2
(45) Date of Patent: Dec. 2, 2025

(54) CARRIER PROTEIN SUBJECTED TO SITE-DIRECTED MUTATION AND USE THEREOF IN PREPARATION OF VACCINE

(71) Applicant: CANSINO BIOLOGICS INC., Tianjin (CN)

(72) Inventors: Haomeng Wang, Tianjin (CN); Zhihong Yan, Tianjin (CN); Qiaoling Yan, Tianjin (CN); Juan Shao, Tianjin (CN); Jianming Shi, Tianjin (CN); Xiuwen Sui, Tianjin (CN); Junqiang Li, Tianjin (CN); Tao Zhu, Tianjin (CN)

(73) Assignee: CANSINO BIOLOGICS INC., Tianjin (CN)

(*) Notice: Subject to any disclaimer, the term of this patent is extended or adjusted under 35 U.S.C. 154(b) by 326 days.

(21) Appl. No.: 18/150,496

(22) Filed: Jan. 5, 2023

(65) Prior Publication Data
US 2023/0183298 A1    Jun. 15, 2023

Related U.S. Application Data

(63) Continuation of application No. PCT/CN2021/090074, filed on Apr. 27, 2021.

(30) Foreign Application Priority Data

Jul. 7, 2020 (CN) .......................... 202010643326.1

(51) Int. Cl.
| C07K 14/22 | (2006.01) |
| A61K 39/116 | (2006.01) |
| A61K 47/64 | (2017.01) |
| A61K 47/65 | (2017.01) |

(52) U.S. Cl.
CPC ............ *C07K 14/22* (2013.01); *A61K 39/116* (2013.01); *A61K 47/64* (2017.08); *A61K 47/65* (2017.08)

(58) Field of Classification Search
CPC .. A61K 47/646; A61K 47/542; A61K 47/544; C07C 323/59; C07C 2601/02; A61P 31/04
See application file for complete search history.

(56) References Cited

FOREIGN PATENT DOCUMENTS

| CN | 106929482 A | 7/2017 |
| CN | 101087808 A | 12/2017 |
| CN | 110845587 A | 2/2020 |
| CN | 111533792 A | 8/2020 |
| JP | 2019526261 A | 9/2019 |
| KR | 20190064577 A | 6/2019 |
| KR | 20190112081 A | 10/2019 |
| WO | 2013123282 A | 8/2013 |
| WO | 2018058086 A1 | 3/2018 |
| WO | 2018126229 A2 | 7/2018 |

OTHER PUBLICATIONS

CNIPA First Office Action for Serial No. CN202010643326.1, not dated.
International Search Report for Serial No. PCT/CN2021/090074; Issued Jul. 26, 2021.
Written Opinion of the International Searching Authority for serial No. PCT/CN2021/090074; issued Jun. 26, 2021.
R. Kowalczyk, et al.; Peptide Lipidation—a Synthetic Strategy to Afford Peptide Based Therapeutics; Peptide and Peptide-based Biomaterials and their Biomedical Applications; Oct. 29, 2017; Abstract, p. 200 left-hand column, p. 209 right-hand column scheme 9.10-scheme 9.13; Online.
Lyn H Jones; Recent Advances in the Molecular Design of Synthetic Vaccines; Nature Chemistry; Nov. 20, 2015; p. 952-960; vol. 7; London, England.
Canadian Office Action for Serial No. 3,185,421; issued Mar. 21, 2024.
Nalla, Naresh, et al.; Design, synthesis and immunological evaluation of 1,2,3-triazole-tethered carbohydrate-Pam 3Cys conjugates as TLR2 agonists; Bioorganic & Medicinal Chemistry; vol. 23; Jul. 4, 2015; pp. 5846-5855; Online; DOI: 10.1016/j.bmc.2015.06.070.
Extended European Search Report for EP Serial No. 21 83 7338; issued Apr. 24, 2024.
Notice of Reason for Refusal for JP Serial No. 2022-581652; issued Dec. 14, 2023.
Request for Submission of an Opinion for KR Serial No. 10-2022-7046500; issued Jun. 9, 2025.
Jane W. Marsh et al.; Diversity of factor H-binding protein in Neisseria meningitidis carriage isolates; Vaccine; vol. 29; Jun. 24, 2011; pp. 6049-6058; Online; DOI: 10.1016/j.vaccine.2011.06.025.
Lared; Meningococcal ACWY vaccine (Nimenrix®) and convulsion; Pharmacovigilance Centre Lareb; Jul. 4, 2019; pp. 1-5; the Netherlands.
Silvia Principato, et al.; Meningococcal factor H binding protein as immune evasion factor and vaccine antigen; FEBS Letters; vol. 594; May 12, 2020; pp. 2657-2669; Online; doi: 10.1002/1873-3468. 13793.
Qingjiang Li, et al.; Recent Advances in Toll Like Receptor-Targeting Glycoconjugate Vaccines; Molecules; vol. 23; Article 1583; Jun. 29, 2018; pp. 1-24; Online; doi:10.3390/molecules23071583.

(Continued)

*Primary Examiner* — Iqbal H Chowdhury
(74) *Attorney, Agent, or Firm* — Flener IP & Business Law

(57) ABSTRACT

Provided are a protein antigen subjected to site-directed mutation and site-directed modification, and a method for site-directed mutation and site-directed modification of the protein antigen. The method comprises: site-directedly introducing an unnatural amino acid into a specific site of the protein antigen by genetic codon expansion technique; and performing site-directed modification with the protein antigen by the unnatural amino acid and a modifier, wherein the modifier is a receptor agonist such as tripalmitoyl-S-glyceryl cysteine and monophosphoryl lipid A. Further provided is use of the protein antigen subjected to site-directed mutation and site-directed modification, such as use as a vaccine.

4 Claims, 3 Drawing Sheets

Figure 1:
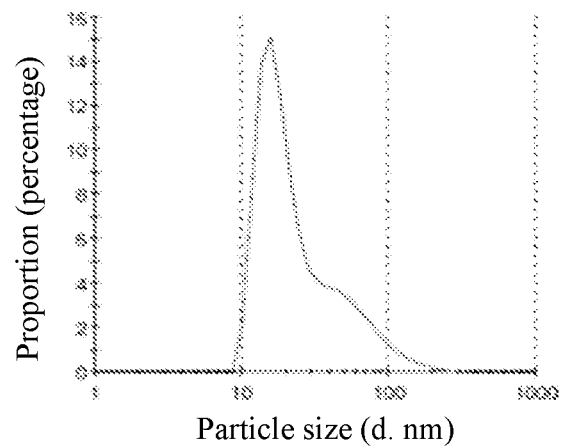

Specification includes a Sequence Listing.

(56) References Cited

OTHER PUBLICATIONS

Zhifang Zhou, et al.; Synthesis and Evaluation of GM2-Monophosphoryl Lipid A Conjugate as a Fully Synthetic Self-Adjuvant Cancer Vaccine; Scientific Reports; vol. 7; Article 11403; Sep. 12, 2017; pp. 1-13; Online; DOI:10.1038/s41598-017-11500-w.

Ronni A.G. Da Silva, et al.; Variant Signal Peptides of Vaccine Antigen, FHbp, Impair Processing Affecting Surface Localization and Antibody-meditated Killing in Most Meningococcal Isolates; Frontiers in Microbiology; vol. 10; Article 2847; Dec. 19, 2019; pp. 4-10; Online; doi: 10.3389/fmicb.2019.02847.

```
                        SEQUENCE LISTING

Sequence total quantity: 57
SEQ ID NO: 1            moltype = AA  length = 261
FEATURE                 Location/Qualifiers
source                  1..261
                        mol_type = protein
                        note = Amino acid sequence of MenB V.155
                        organism = unidentified
SEQUENCE: 1
CGSSGGGGSG GGGVTADIGT GLADALTAPL DHKDKGLKSL TLEDSISQNG TLTLSAQGAE  60
KTYGNGDSLN TGKLKNDKVS RFDFIRQIEV DGQLITLESG EFQVYKQSHS ALTALQTEQE 120
QDPEHSEKMV AKRRFRIGDI AGEHTSFDKL PKDVMATYRG TAFGSDDAGG KLTYTIDFAA 180
KQGHGKIEHL KSPELNVDLA VAYIKPDEKH HAVISGSVLY NQDEKGSYSL GIFGEKAQEV 240
AGSAEVETAN GIHHIGLAAK Q                                           261

SEQ ID NO: 2            moltype = AA  length = 255
FEATURE                 Location/Qualifiers
source                  1..255
                        mol_type = protein
                        note = Amino acid sequence of MenB V2.16
                        organism = unidentified
SEQUENCE: 2
CGSSGGGGVA ADIGAGLADA LTAPLDHKDK SLQSLTLDQS VRKNEKLKLA AQGAEKTYGN  60
GDSLNTGKLK NDKVSRFDFI RQIEVDGQLI TLESGEFQIY KQDHSAVVAL QIEKINNPDK 120
IDSLINQRSF LVSGLGGEHT AFNQLPDGKA EYHGKAFSSD DAGGKLTYTI DFAAKQGHGK 180
IEHLKTPEQN VELAAAELKA DEKSHAVILG DTRYGSEEKG TYHLALFGDR AQEIAGSATV 240
KIGEKVHEIG IAGKQ                                                  255

SEQ ID NO: 3            moltype = AA  length = 258
FEATURE                 Location/Qualifiers
source                  1..258
                        mol_type = protein
                        note = Amino acid sequence of MenB V3.45
                        organism = unidentified
SEQUENCE: 3
CGSSGGGGVA ADIGTGLADA LTAPLDHKDK GLKSLTLEDS ISQNGTLTLS AQGAEKTFKV  60
GDKDNSLNTG KLKNDKISRF DFVQKIEVDG QTITLASGEF QIYKQDHSAV VALQIEKINN 120
PDKIDSLINQ RSFLVSGLGG EHTAFNQLPS GKAEYHGKAF SSDDAGGKLT YTIDFAAKQG 180
HGKIEHLKTP EQNVELASAE LKADEKSHAV ILGDTRYGSE EKGTYHLALF GDRAQEIAGS 240
ATVKIREKVH EIGIAGKQ                                               258

SEQ ID NO: 4            moltype = DNA  length = 43
FEATURE                 Location/Qualifiers
source                  1..43
                        mol_type = other DNA
                        note = Forward primer for MenB V1.55 G2 mutation site
                        organism = synthetic construct
SEQUENCE: 4
ggagatatac catgggttgt tagagcagcg gtggtggtgg tag                    43

SEQ ID NO: 5            moltype = DNA  length = 23
FEATURE                 Location/Qualifiers
source                  1..23
                        mol_type = other DNA
                        note = Reverse primer for MenB V1.55 G2 mutation site
                        organism = synthetic construct
SEQUENCE: 5
ctaacaaccc atggtatatc tcc                                          23

SEQ ID NO: 6            moltype = DNA  length = 43
FEATURE                 Location/Qualifiers
source                  1..43
                        mol_type = other DNA
                        note = Forward primer for MenB V1.55 S3 mutation site
                        organism = synthetic construct
SEQUENCE: 6
gatataccat gggttgtggt tagagcggtg gtggtggtag tgg                    43

SEQ ID NO: 7            moltype = DNA  length = 23
FEATURE                 Location/Qualifiers
source                  1..23
                        mol_type = other DNA
```

```
                                note = Reverse primer for MenB V1.55 S3 mutation site
                                organism = synthetic construct
SEQUENCE: 7
ctaaccacaa cccatggtat atc                                                      23

SEQ ID NO: 8           moltype = DNA   length = 43
FEATURE                Location/Qualifiers
source                 1..43
                       mol_type = other DNA
                       note = Forward primer for MenB V1.55 S4 mutation site
                       organism = synthetic construct
SEQUENCE: 8
ataccatggg ttgtggtagc tagggtggtg gtggtagtgg tgg                                43

SEQ ID NO: 9           moltype = DNA   length = 23
FEATURE                Location/Qualifiers
source                 1..23
                       mol_type = other DNA
                       note = Reverse primer for MenB V1.55 S4 mutation site
                       organism = synthetic construct
SEQUENCE: 9
ctagctacca caacccatgg tat                                                      23

SEQ ID NO: 10          moltype = DNA   length = 43
FEATURE                Location/Qualifiers
source                 1..43
                       mol_type = other DNA
                       note = Forward primer for MenB V1.55 G5 mutation site
                       organism = synthetic construct
SEQUENCE: 10
ccatgggttg tggtagcagc tagggtggtg gtagtggtgg cgg                                43

SEQ ID NO: 11          moltype = DNA   length = 23
FEATURE                Location/Qualifiers
source                 1..23
                       mol_type = other DNA
                       note = Reverse primer for MenB V1.55 G5 mutation site
                       organism = synthetic construct
SEQUENCE: 11
ctagctgcta ccacaaccca tgg                                                      23

SEQ ID NO: 12          moltype = DNA   length = 43
FEATURE                Location/Qualifiers
source                 1..43
                       mol_type = other DNA
                       note = Forward primer for MenB V1.55 G6 mutation site
                       organism = synthetic construct
SEQUENCE: 12
tgggttgtgg tagcagcggt tagggtggta gtggtggcgg tgg                                43

SEQ ID NO: 13          moltype = DNA   length = 23
FEATURE                Location/Qualifiers
source                 1..23
                       mol_type = other DNA
                       note = Reverse primer for MenB V1.55 G6 mutation site
                       organism = synthetic construct
SEQUENCE: 13
ctaaccgctg ctaccacaac cca                                                      23

SEQ ID NO: 14          moltype = DNA   length = 43
FEATURE                Location/Qualifiers
source                 1..43
                       mol_type = other DNA
                       note = Forward primer for MenB V1.55 G7 mutation site
                       organism = synthetic construct
SEQUENCE: 14
gttgtggtag cagcggtggt tagggtagtg gtggcggtgg tgt                                43

SEQ ID NO: 15          moltype = DNA   length = 23
FEATURE                Location/Qualifiers
source                 1..23
                       mol_type = other DNA
                       note = Reverse primer for MenB V1.55 G7 mutation site
                       organism = synthetic construct
SEQUENCE: 15
ctaaccaccg ctgctaccac aac                                                      23

SEQ ID NO: 16          moltype = DNA   length = 43
FEATURE                Location/Qualifiers
```

```
source                  1..43
                        mol_type = other DNA
                        note = Forward primer for MenB V1.55 G8 mutation site
                        organism = synthetic construct
SEQUENCE: 16
gtggtagcag cggtggtggt tagagtggtg gcggtggtgt tac                      43

SEQ ID NO: 17           moltype = DNA   length = 23
FEATURE                 Location/Qualifiers
source                  1..23
                        mol_type = other DNA
                        note = Reverse primer for MenB V1.55 G8 mutation site
                        organism = synthetic construct
SEQUENCE: 17
ctaaccacca ccgctgctac cac                                            23

SEQ ID NO: 18           moltype = DNA   length = 43
FEATURE                 Location/Qualifiers
source                  1..43
                        mol_type = other DNA
                        note = Forward primer for MenB V1.55 S9 mutation site
                        organism = synthetic construct
SEQUENCE: 18
gtagcagcgg tggtggtggt tagggtggcg gtggtgttac cgc                      43

SEQ ID NO: 19           moltype = DNA   length = 23
FEATURE                 Location/Qualifiers
source                  1..23
                        mol_type = other DNA
                        note = Reverse primer for MenB V1.55 S9 mutation site
                        organism = synthetic construct
SEQUENCE: 19
ctaaccacca ccaccgctgc tac                                            23

SEQ ID NO: 20           moltype = DNA   length = 43
FEATURE                 Location/Qualifiers
source                  1..43
                        mol_type = other DNA
                        note = Forward primer for MenB V1.55 G10 mutation site
                        organism = synthetic construct
SEQUENCE: 20
gcagcggtgg tggtggtagt tagggcggtg gtgttaccgc aga                      43

SEQ ID NO: 21           moltype = DNA   length = 23
FEATURE                 Location/Qualifiers
source                  1..23
                        mol_type = other DNA
                        note = Reverse primer for MenB V1.55 G10 mutation site
                        organism = synthetic construct
SEQUENCE: 21
ctaactacca ccaccaccgc tgc                                            23

SEQ ID NO: 22           moltype = DNA   length = 43
FEATURE                 Location/Qualifiers
source                  1..43
                        mol_type = other DNA
                        note = Forward primer for MenB V2.16 G2 mutation site
                        organism = synthetic construct
SEQUENCE: 22
ggagatatac catgggttgt tagagcagcg gtggtggtgg cgt                      43

SEQ ID NO: 23           moltype = DNA   length = 23
FEATURE                 Location/Qualifiers
source                  1..23
                        mol_type = other DNA
                        note = Reverse primer for MenB V2.16 G2 mutation site
                        organism = synthetic construct
SEQUENCE: 23
ctaacaaccc atggtatatc tcc                                            23

SEQ ID NO: 24           moltype = DNA   length = 43
FEATURE                 Location/Qualifiers
source                  1..43
                        mol_type = other DNA
                        note = Forward primer for MenB V2.16 S3 mutation site
                        organism = synthetic construct
SEQUENCE: 24
gatataccat gggttgtggt tagagcggtg gtggtggcgt tgc                      43
```

-continued

```
SEQ ID NO: 25          moltype = DNA  length = 23
FEATURE                Location/Qualifiers
source                 1..23
                       mol_type = other DNA
                       note = Reverse primer for MenB V2.16 S3 mutation site
                       organism = synthetic construct
SEQUENCE: 25
ctaaccacaa cccatggtat atc                                           23

SEQ ID NO: 26          moltype = DNA  length = 43
FEATURE                Location/Qualifiers
source                 1..43
                       mol_type = other DNA
                       note = Forward primer for MenB V2.16 S4 mutation site
                       organism = synthetic construct
SEQUENCE: 26
ataccatggg ttgtggtagc tagggtggtg gtggcgttgc agc                     43

SEQ ID NO: 27          moltype = DNA  length = 23
FEATURE                Location/Qualifiers
source                 1..23
                       mol_type = other DNA
                       note = Reverse primer for MenB V2.16 S4 mutation site
                       organism = synthetic construct
SEQUENCE: 27
ctagctacca caacccatgg tat                                           23

SEQ ID NO: 28          moltype = DNA  length = 43
FEATURE                Location/Qualifiers
source                 1..43
                       mol_type = other DNA
                       note = Forward primer for MenB V2.16 G5 mutation site
                       organism = synthetic construct
SEQUENCE: 28
ccatgggttg tggtagcagc tagggtggtg gcgttgcagc aga                     43

SEQ ID NO: 29          moltype = DNA  length = 23
FEATURE                Location/Qualifiers
source                 1..23
                       mol_type = other DNA
                       note = Reverse primer for MenB V2.16 G5 mutation site
                       organism = synthetic construct
SEQUENCE: 29
ctagctgcta ccacaaccca tgg                                           23

SEQ ID NO: 30          moltype = DNA  length = 43
FEATURE                Location/Qualifiers
source                 1..43
                       mol_type = other DNA
                       note = Forward primer for MenB V2.16 G6 mutation site
                       organism = synthetic construct
SEQUENCE: 30
tgggttgtgg tagcagcggt tagggtggcg ttgcagcaga tat                     43

SEQ ID NO: 31          moltype = DNA  length = 23
FEATURE                Location/Qualifiers
source                 1..23
                       mol_type = other DNA
                       note = Reverse primer for MenB V2.16 G6 mutation site
                       organism = synthetic construct
SEQUENCE: 31
ctaaccgctg ctaccacaac cca                                           23

SEQ ID NO: 32          moltype = DNA  length = 43
FEATURE                Location/Qualifiers
source                 1..43
                       mol_type = other DNA
                       note = Forward primer for MenB V2.16 G7 mutation site
                       organism = synthetic construct
SEQUENCE: 32
gttgtggtag cagcggtggt tagggcgttg cagcagatat tgg                     43

SEQ ID NO: 33          moltype = DNA  length = 23
FEATURE                Location/Qualifiers
source                 1..23
                       mol_type = other DNA
                       note = Reverse primer for MenB V2.16 G7 mutation site
                       organism = synthetic construct
SEQUENCE: 33
```

```
ctaaccaccg ctgctaccac aac                                              23

SEQ ID NO: 34           moltype = DNA   length = 43
FEATURE                 Location/Qualifiers
source                  1..43
                        mol_type = other DNA
                        note = Forward primer for MenB V2.16 G8 mutation site
                        organism = synthetic construct
SEQUENCE: 34
gtggtagcag cggtggtggt taggttgcag cagatattgg tgc                        43

SEQ ID NO: 35           moltype = DNA   length = 23
FEATURE                 Location/Qualifiers
source                  1..23
                        mol_type = other DNA
                        note = Reverse primer for MenB V2.16 G8 mutation site
                        organism = synthetic construct
SEQUENCE: 35
ctaaccacca ccgctgctac cac                                              23

SEQ ID NO: 36           moltype = DNA   length = 43
FEATURE                 Location/Qualifiers
source                  1..43
                        mol_type = other DNA
                        note = Forward primer for MenB V2.16 V9 mutation site
                        organism = synthetic construct
SEQUENCE: 36
gtagcagcgg tggtggtggc taggcagcag atattggtgc agg                        43

SEQ ID NO: 37           moltype = DNA   length = 23
FEATURE                 Location/Qualifiers
source                  1..23
                        mol_type = other DNA
                        note = Reverse primer for MenB V2.16 V9 mutation site
                        organism = synthetic construct
SEQUENCE: 37
ctagccacca ccaccgctgc tac                                              23

SEQ ID NO: 38           moltype = DNA   length = 43
FEATURE                 Location/Qualifiers
source                  1..43
                        mol_type = other DNA
                        note = Forward primer for MenB V2.16 A10 mutation site
                        organism = synthetic construct
SEQUENCE: 38
gcagcggtgg tggtggcgtt taggcagata ttggtgcagg tct                        43

SEQ ID NO: 39           moltype = DNA   length = 23
FEATURE                 Location/Qualifiers
source                  1..23
                        mol_type = other DNA
                        note = Reverse primer for MenB V2.16 A10 mutation site
                        organism = synthetic construct
SEQUENCE: 39
ctaaacgcca ccaccaccgc tgc                                              23

SEQ ID NO: 40           moltype = DNA   length = 43
FEATURE                 Location/Qualifiers
source                  1..43
                        mol_type = other DNA
                        note = Forward primer for MenB V3.45 G2 mutation site
                        organism = synthetic construct
SEQUENCE: 40
ggagatatac catgggttgt tagagcagcg gtggtggtgg cgt                        43

SEQ ID NO: 41           moltype = DNA   length = 23
FEATURE                 Location/Qualifiers
source                  1..23
                        mol_type = other DNA
                        note = Reverse primer for MenB V3.45 G2 mutation site
                        organism = synthetic construct
SEQUENCE: 41
ctaacaaccc atggtatatc tcc                                              23

SEQ ID NO: 42           moltype = DNA   length = 43
FEATURE                 Location/Qualifiers
source                  1..43
                        mol_type = other DNA
                        note = Forward primer for MenB V3.45 S3 mutation site
```

```
                                    organism = synthetic construct
SEQUENCE: 42
gatataccat gggttgtggt tagagcggtg gtggtggcgt tgc                      43

SEQ ID NO: 43           moltype = DNA   length = 23
FEATURE                 Location/Qualifiers
source                  1..23
                        mol_type = other DNA
                        note = Reverse primer for MenB V3.45 S3 mutation site
                        organism = synthetic construct
SEQUENCE: 43
ctaaccacaa cccatggtat atc                                            23

SEQ ID NO: 44           moltype = DNA   length = 43
FEATURE                 Location/Qualifiers
source                  1..43
                        mol_type = other DNA
                        note = Forward primer for MenB V3.45 S4 mutation site
                        organism = synthetic construct
SEQUENCE: 44
ataccatggg ttgtggtagc tagggtggtg tggcgttgc agc                       43

SEQ ID NO: 45           moltype = DNA   length = 23
FEATURE                 Location/Qualifiers
source                  1..23
                        mol_type = other DNA
                        note = Reverse primer for MenB V3.45 S4 mutation site
                        organism = synthetic construct
SEQUENCE: 45
ctagctacca caacccatgg tat                                            23

SEQ ID NO: 46           moltype = DNA   length = 43
FEATURE                 Location/Qualifiers
source                  1..43
                        mol_type = other DNA
                        note = Forward primer for MenB V3.45 G5 mutation site
                        organism = synthetic construct
SEQUENCE: 46
ccatgggttg tggtagcagc tagggtggtg gcgttgcagc aga                      43

SEQ ID NO: 47           moltype = DNA   length = 23
FEATURE                 Location/Qualifiers
source                  1..23
                        mol_type = other DNA
                        note = Reverse primer for MenB V3.45 G5 mutation site
                        organism = synthetic construct
SEQUENCE: 47
ctagctgcta ccacaaccca tgg                                            23

SEQ ID NO: 48           moltype = DNA   length = 43
FEATURE                 Location/Qualifiers
source                  1..43
                        mol_type = other DNA
                        note = Forward primer for MenB V3.45 G6 mutation site
                        organism = synthetic construct
SEQUENCE: 48
tggttgtgg tagcagcggt tagggtggcg ttgcagcaga tat                       43

SEQ ID NO: 49           moltype = DNA   length = 23
FEATURE                 Location/Qualifiers
source                  1..23
                        mol_type = other DNA
                        note = Reverse primer for MenB V3.45 G6 mutation site
                        organism = synthetic construct
SEQUENCE: 49
ctaaccgctg ctaccacaac cca                                            23

SEQ ID NO: 50           moltype = DNA   length = 43
FEATURE                 Location/Qualifiers
source                  1..43
                        mol_type = other DNA
                        note = Forward primer for MenB V3.45 G7 mutation site
                        organism = synthetic construct
SEQUENCE: 50
gttgtggtag cagcggtggt tagggcgttg cagcagatat tgg                      43

SEQ ID NO: 51           moltype = DNA   length = 23
FEATURE                 Location/Qualifiers
source                  1..23
```

```
                    mol_type = other DNA
                    note = Reverse primer for MenB V3.45 G7 mutation site
                    organism = synthetic construct
SEQUENCE: 51
ctaaccaccg ctgctaccac aac                                           23

SEQ ID NO: 52       moltype = DNA  length = 43
FEATURE             Location/Qualifiers
source              1..43
                    mol_type = other DNA
                    note = Forward primer for MenB V3.45 G8 mutation site
                    organism = synthetic construct
SEQUENCE: 52
gtggtagcag cggtggtggt taggttgcag cagatattgg cac                     43

SEQ ID NO: 53       moltype = DNA  length = 23
FEATURE             Location/Qualifiers
source              1..23
                    mol_type = other DNA
                    note = Reverse primer for MenB V3.45 G8 mutation site
                    organism = synthetic construct
SEQUENCE: 53
ctaaccacca ccgctgctac cac                                           23

SEQ ID NO: 54       moltype = DNA  length = 43
FEATURE             Location/Qualifiers
source              1..43
                    mol_type = other DNA
                    note = Forward primer for MenB V3.45 V9 mutation site
                    organism = synthetic construct
SEQUENCE: 54
gtagcagcgg tggtggtggc taggcagcag atattggcac cgg                     43

SEQ ID NO: 55       moltype = DNA  length = 23
FEATURE             Location/Qualifiers
source              1..23
                    mol_type = other DNA
                    note = Reverse primer for MenB V3.45 V9 mutation site
                    organism = synthetic construct
SEQUENCE: 55
ctagccacca ccaccgctgc tac                                           23

SEQ ID NO: 56       moltype = DNA  length = 43
FEATURE             Location/Qualifiers
source              1..43
                    mol_type = other DNA
                    note = Forward primer for MenB V3.45 A10 mutation site
                    organism = synthetic construct
SEQUENCE: 56
gcagcggtgg tggtggcgtt taggcagata ttggcaccgg tct                     43

SEQ ID NO: 57       moltype = DNA  length = 23
FEATURE             Location/Qualifiers
source              1..23
                    mol_type = other DNA
                    note = Reverse primer for MenB V3.45 A10 mutation site
                    organism = synthetic construct
SEQUENCE: 57
ctaaacgcca ccaccaccgc tgc                                           23
```

CARRIER PROTEIN SUBJECTED TO SITE-DIRECTED MUTATION AND USE THEREOF IN PREPARATION OF VACCINE

CROSS-REFERENCE TO RELATED APPLICATIONS

This application is a continuation of International Application No. PCT/CN2021/090074, filed on Apr. 27, 2021, which claims priority to Chinese Patent Application No. 202010643326.1, filed on Jul. 7, 2020. The disclosures of the aforementioned applications are hereby incorporated by reference in their entireties.

REFERENCE TO AN ELECTRONIC SEQUENCE LISTING

The contents of the electronic sequence listing (CU727SequenceListing.xml; Size: 64,405 bytes; and Date of Creation: Jan. 4, 2023) is herein incorporated by reference in its entirety.

TECHNICAL FIELD

The disclosure relates to the field of biopharmaceuticals, in particular, the disclosure relates to a site-directedly mutated protein, a site-directedly modified protein, and use thereof in the preparation of a vaccine, particularly a multivalent vaccine against meningococcus.

BACKGROUND

Meningococcal meningitis (epidemic cerebrospinal meningitis) caused by Neisseria meningococcus (Nm) infection is a worldwide acute respiratory infectious disease, which still seriously endangers health of human, particularly children. Neisseria meningococcus may be divided into 13 serogroups according to the differences in the structure of their capsular polysaccharides, and all the serogroups may be pathogenic. The diseases caused by Neisseria meningococcus group A, B, C, Y, and W135 account for more than 95% of Neisseria meningococcus-related diseases. Particularly, since its capsular polysaccharide comprises epitope of potential cross immunity with human antigen, Neisseria meningitidis serogroup B (MenB) has weak immunogenicity and may induce autoimmune diseases, therefore, the vaccine research of using group B Nm capsular polysaccharide as immunogen has encountered serious challenges.

At present, the international research on group B Nm vaccines mainly adopts two strategies. One is outer membrane vesicle (OMV) vaccines based on outer membrane protein, for example, three representative OMV vaccines: VA-ENGOC-BC, MenBvac™ group B OMV vaccine, group B meningococcal vaccine MeNZB. The other is a recombinant protein vaccine based on reverse vaccinology technology, for example, 4C MenB (BEXSERO®), bivalent fHBp (r-fHBp), rLP2086. Although there are many products of MenB vaccines on the market or under development, there are still many problems to be solved urgently; for example, there is no internationally accepted MenB OMV vaccine, the protection coverage of OMV vaccine is limited, the production process of MenB OMV affects its antigenicity, and the "broad-spectrum" MenB vaccine is difficult to achieve broad protection.

In general, reviewing the research and development of group B Nm OMV protein vaccines over the past few decades, the clinical disclosure results show that there are large differences in different regions, and the reasons after analysis may be related to the following factors:

① group B has more Nm types and subtypes, and the cross protection between them is weak;
② the antigenicity of the bacterial strains prevailing in each region has regional characteristics differences, and there are still many factors not being revealed so far;
③ The complexity and excessive purification of vaccine preparation processes have changed the three-dimensional natural conformation of bacterial antigens, and induced antibodies lack specificity against the invasion of natural epidemic strains;
④ The multi-step purification process also leads to the loss, damage, and singleness of abundant antigenic sites, thereby affecting its antigenicity.

Bivalent fHBp (r-fHBp) from WYETH® company is a bivalent protein vaccine comprising fHbp types 1 and 3, which has been proven to have a bactericidal effect in adolescents; but in the infant group, the proportion of people with side effects such as fever and local redness is obviously increased. Therefore, further research on Bivalent fHBp (r-fHBp) vaccine is urgently needed to improve its immunogenicity and reduce side effects.

SUMMARY

In view of this, the present disclosure provides a site-directedly mutated protein, a conjugate of the site-directedly mutated protein, a vaccine or immunogenic composition, and use thereof. Particularly, as for the site-directedly mutated protein, the amber codon TAG is introduced at a specific site of the antigenic protein, and then the non-natural amino acid with cross-linking property is site-directedly mutated to the specific site of the antigenic protein by using orthogonal aminoacyl tRNA synthetase-tRNA. The site-directedly mutated protein reacts with the liposome by click reaction to form a covalent bond to obtain a lipoprotein. The site-directedly modified lipoprotein obtained in the present disclosure has consistant liposome length and significantly controllable quality, thereby effectively avoiding the disadvantage of uneven lipidation in the expression process of recombinant lipoproteins, and providing an effective method for improving the quality of lipoprotein vaccines.

Particularly, the present disclosure relates to a site-directedly mutated protein,
wherein the protein is selected from one or more mutant proteins in group B meningococcal fHBP proteins, wherein the amino acid of at least one site on the protein antigen is mutated into an unnatural amino acid comprising azido, alkynyl end group, or other active groups.

The specific type of group B meningococcal fHBP proteins is not limited, and may be selected according to practical needs. The mutated amino acid site is preferably a site that does not affect the antigenic epitope, so as to reduce the impact of amino acid mutation on the immunogenicity of the protein antigen.

In a particular embodiment of the present disclosure, the protein is selected from variant proteins formed by one or more in group B meningococcal fHBP proteins; preferably, the protein antigen is selected from: variants 2 and 3 in subfamily A or variant 1 in subfamily B of B meningococcal fHBP proteins.

In a particular embodiment of the present disclosure, the unnatural amino acid is a phenylalanine derivative, a tyrosine derivative, a glutamine derivative, an alanine derivative, a cysteine derivative, a serine derivative, or a lysine derivative.

Preferably, the unnatural amino acid is a lysine derivative comprising an azido.

More preferably, the unnatural amino acid is:

$$N_3\diagdown\diagdown O\diagdown\underset{H}{N}\diagdown\diagdown\diagdown\underset{NH_2}{COOH}$$

Lys-aszido

Exemplarily, the mutation site of the protein antigen is one or more amino acids without affecting the antigenic epitope.

In one embodiment of the present disclosure, the protein antigen is variant 2 in subfamily A of group B meningococcal fHBP protein antigens, and the mutation site may be one or more amino acids at any site in SEQ ID NO: 1. Preferably, the mutation site of the protein antigen is a site in the amino acid sequence of positions 2-30 in SEQ ID NO: 1 or other sites without affecting the antigenic epitope. More preferably, the mutation site is one or more amino acids in the amino acid sequence of positions 2-10 in SEQ ID NO: 1.

In one embodiment of the present disclosure, the protein antigen is variant 3 in subfamily A of group B meningococcal fHBP protein antigen, and the mutation site may be one or more amino acids at any site in SEQ ID NO: 2. Preferably, the mutation site of the protein antigen is a site in the amino acid sequence of positions 2-30 in SEQ ID NO: 2 or other sites without affecting the antigenic epitope. More preferably, the mutation site is one or more amino acids in the amino acid sequence of positions 2-10 in SEQ ID NO: 2.

In one embodiment of the present disclosure, the protein antigen is variant 1 in subfamily B of group B meningococcal fHBP protein antigen, and the mutation site of the protein antigen is one or more amino acids at any site in SEQ ID NO: 3. Preferably, the mutation site of the protein antigen is a site in the amino acid sequence of positions 2-10 in SEQ ID NO: 3 or other sites without affecting the antigenic epitope. More preferably, the mutation site is one or more amino acids in the amino acid sequence of positions 2-10 in SEQ ID NO: 3.

After mutation, the difference between the amino acid sequence of the site-directedly mutated protein and the target protein before mutation is that: the amino acid at position X in the amino acid sequence of the protein before mutation is mutated into Lys-azido, and the connection mode of the mutated amino acid is as follows:

wherein X is the mutation site, and AA is the amino acid before or after the mutation site.

The present disclosure also provides a method for preparing a site-directedly mutated protein, which comprises the following steps: site-directedly introducing an unnatural amino acid into a specific position of a protein by gene codon extension technology, so as to obtain a site-directedly mutated protein.

The present disclosure also provides a conjugate of a site-directedly mutated group B meningococcal fHBP protein antigen, wherein the conjugate is prepared by further coupling the site-directedly mutated protein of the disclosure with a modification compound.

In one embodiment of the present disclosure, the modification compound is a compound with an end group comprising alkynyl group or a modified alkynyl group.

In a particular embodiment of the present disclosure, the modification compound is selected from: a carbohydrate, a nucleic acid, an amino acid, a polypeptide or a small molecule compound which comprises a alkyne end group; or a modification product of a carbohydrate, a nucleic acid, an amino acid, a polypeptide or a small molecule compound which is obtained by modifying with a terminal alkynyl group.

The carbohydrate, nucleic acid, amino acid, polypeptide or small molecular compound of this disclosure may be a modification product of a carbohydrate, nucleic acid, amino acid, polypeptide or small molecule compound which is obtained by modifying with a terminal alkynyl group; and it may be prepared by site-directedly coupling through the catalysis of monovalent copper to obtain a conjugate; alternatively, the carbohydrate, nucleic acid, amino acid, polypeptide or small molecular compound of this disclosure may be a modification product obtained by using cyclooctyne or its derivative as a modification group, thereby directly realizing site-directedly coupling.

The site-directedly mutated group B meningococcal fHBP protein according to this disclosure and the molecule comprising alkynyl end group or modified by alkynyl end group are prepared by click reaction.

The click reaction may be a click reaction mediated by monovalent copper, or a copper-free click reaction mediated by cyclooctyne or its derivative.

In a particular embodiment of the present disclosure, the modification compound is a lipoprotein receptor agonist. Preferably, the modification compound is a TLR2 receptor agonist.

Exemplarily, the agonist is selected from: tripalmitoyl-S-glyceryl cysteine, monophosphoryl lipid A, dipalmitoyl-S-glyceryl-cysteine, or an analogue thereof.

Exemplarily, the amino acid at position X of the amino acid sequence of the protein is mutated and modified into the following structure:

wherein X is a mutation site, AA is an amino acid before or after the mutation site, n=1-20, and $R_2$ is a TLR2 receptor agonist.

Preferably, $R_2$ is tripalmitoyl-S-glyceryl cysteine, monophosphoryl lipid A, dipalmitoyl-S-glyceryl-cysteine, or an analogue thereof; more preferably, a tripalmitoyl-S-glycerocysteine analogue, and is selected from an analogue of the following structural formula:

wherein n, m=1-5.

In a particular embodiment of the present disclosure, $R_2$ is a monophosphoryl lipid A receptor agonist or a derivative thereof; preferably a monophosphoryl lipid A receptor agonist with a structural formula as follows:

n=1-20, the R terminal may be coupled with a site-directedly mutated group B meningococcal fHBP protein, wherein $R_3$ is selected from phosphate or H;

$R_4$ is selected from n is 1,3,5; or $R_5$ selected from $R_6$ is selected from H or $R_7$ selected from , or $R_8$ is selected from H or OH.

Exemplarily, the molar ratio of the group B meningococcal fHBP protein to the modification compound in the conjugate is 1:1-30.

In a particular embodiment of the present disclosure, the group B meningococcal fHBP protein is variant 2 in subfamily A, and the mutation site of the fHBP protein is one or more amino acids in the amino acid sequence of positions 2-30 in SEQ ID NO: 1; preferably, the mutation site is one or more amino acids in the amino acid sequence of positions 2-10 in SEQ ID NO: 1.

In a particular embodiment of the present disclosure, the group B meningococcal fHBP protein is variant 3 in subfamily A, and the mutation site of the fHBP protein is one or more amino acids in the amino acid sequence of positions 2-30 in SEQ ID NO: 2; preferably, the mutation site is one or more amino acids in the amino acid sequence of positions 2-10 in SEQ ID NO: 2.

In a particular embodiment of the present disclosure, the group B meningococcal fHBP protein is variant 1 in subfamily B, and the mutation site of the fHBP protein may be one or more amino acids in the amino acid sequence of positions 2-30 in SEQ ID NO: 3; preferably, the mutation site is one or more amino acids in the amino acid sequence of positions 2-10 in SEQ ID NO: 3.

The present disclosure also relates to a vaccine or immunogenic composition comprising one or more of the site-directedly mutated protein or the conjugate.

In a particular embodiment of the present disclosure, the vaccine or immunogenic composition simultaneously comprises the three site-directedly mutated proteins mentioned above to form a multivalent vaccine or immunogenic composition, or simultaneously comprise the three conjugates mentioned above to form a multivalent vaccine or immunogenic composition.

Exemplarily, the dose of the site-directedly mutated group B meningococcal fHBP proteins or conjugates is 10-100 µg.

Further, the vaccine or immunogenic composition comprises a pharmaceutically acceptable excipient, a carrier or a diluent. Further, the vaccine or immunogenic composition is used in combination with group ACW135Y meningococcal polysaccharide conjugate vaccine.

Exemplarily, each dose of the vaccine or immunogenic composition comprises: 5-10 µg of group A meningococcal polysaccharide antigen, 5-10 µg of group C meningococcal polysaccharide antigen, 5-10 µg of group W135 meningococcal polysaccharide antigen, 5-10 µg of group Y meningococcal polysaccharide antigen, or 10-100 µg of site-directedly mutated group B meningococcal fHBP protein or a conjugate thereof.

The present disclosure also relates to use of the site-directedly mutated protein, the conjugate, or the immunogenic composition in the preparation of a vaccine. The vaccine is a meningococcal vaccine.

The present disclosure also relates to a method for site-directed mutation and site-directed modification of a protein antigen, wherein the method comprises: site-directedly introducing an unnatural amino acid into a specific site of the protein antigen by genetic codon expansion technique to obtain a site-directedly mutated protein which is further coupled with a modification compound, and wherein the modification compound is a compound with an end group comprising alkynyl group or a modified alkynyl group.

With careful consideration and research based on the prior art, the inventors site-directedly incorporated a non-natural amino acid into a protein by utilizing the protein translation system of tRNA (tRNA$^{Pyl}$) and pyrrolysine-tRNA synthetase (tRNA$^{Pyl}$/PylRS) of *Methanococcus* of archaea, so as to obtain the site-directedly mutated target peptide or protein (pre-modification), such as variants 2 and 3 in subfamily A and variant 1 in subfamily B of the group B meningococcal fHBP proteins, and then the site-directedly mutated antigenic protein is used as the raw material for site-directed modification (the pre-modified recombinant protein fHBP of the present disclosure has been proven to prevent the infection of group B meningococcus), and the site-directedly mutated antigen protein is conjugated with a liposome to obtain a site-directedly modified lipoprotein.

Particularly, the protein is selected from variant proteins formed by one or more of the group B meningococcal fHBP proteins; preferably, the protein antigen is selected from variants 2 and 3 in subfamily A and variant 1 in subfamily B of the group B meningococcal fHBP proteins. The unnatural amino acid is at least one selected from the group consisting of: a phenylalanine derivative, tyrosine derivative, glutamine derivative, alanine derivative, cysteine derivative, serine derivative, or lysine derivative.

Preferably, the unnatural amino acid is a lysine derivative comprising an azido.

More preferably, the unnatural amino acid is $$N_3 \diagdown \diagdown O \diagdown \underset{H}{N} \diagdown \diagdown \diagdown \underset{NH_2}{\overset{COOH}{\diagdown}}$$

Particularly, the modification compound is selected from: a carbohydrate, nucleic acid, amino acid, polypeptide or small molecule compound which comprises a alkyne end group; or a modification product of a carbohydrate, nucleic acid, amino acid, polypeptide or small molecule compound which is obtained by modifying with a terminal alkynyl group. Preferably, the modification compound is a lipoprotein receptor agonist.

Exemplarily, the lipoprotein receptor agonist is selected from: tripalmitoyl-S-glyceryl cysteine, monophosphoryl lipid A, dipalmitoyl-S-glyceryl-cysteine, or an analogue thereof.

The lipoprotein receptor agonist is a tripalmitoyl-S-glyceryl cysteine analogue, and is selected from analogues of the following structural formula:

wherein n, m=1-5.

The present disclosure also relates to a tripalmitoyl-S-glycerolcysteine analogue for site-directed mutation and site-directed modification of a protein antigen, which is selected from analogues of the following structural formula:

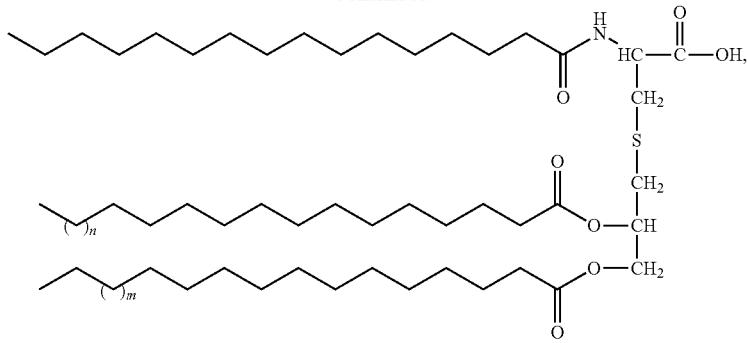

wherein n, m=1-5.

Compared with other methods, the advantages of the present disclosure may be reflected in one or more of the following:
1. The site-directedly mutated protein provided by this disclosure may be introduced an unnatural amino acid at any position of the protein, thereby creating a protein antigen in which only said position may be specifically modified;
2. The site-directedly mutated protein provided by this disclosure may achieve efficient and specific modification by using the unique active groups on unnatural amino acids;
3. The conjugate provided by this disclosure may realize efficient, harmless, simple and easy modification reaction to a protein through the optimization of modification conditions and the copper-free click reaction mediated by cyclooctyne;
4. The conjugate provided by this disclosure may obtain a conjugate of group B meningococcal fHBP protein through introduction of a structurally confirmed modification group, and the conjugate has uniform composition and controllable quality, thereby significantly reducing the degree of side reactions and ensuring immunogenicity;
5. The site-directedly mutated protein or conjugate provided in this disclosure may be used in combination with the group ACW135Y conjugate vaccine to improve its protection coverage.

BRIEF DESCRIPTION OF THE DRAWINGS

FIG. 1 is a particle size diagram of MenB-V1.55 protein;

FIG. 2 is a particle size diagram of MenB-V2.16 protein;

FIG. 3 is a particle size diagram of MenB-V1.55-G2-L1 protein;

FIG. 4 is a particle size diagram of MenB-V2.16-S3-L1 protein;

FIG. 5 is a particle size diagram of MenB-V2.16-S3-L1 protein.

DETAILED DESCRIPTION OF THE EMBODIMENTS

The present disclosure will be further elaborated below in conjunction with particular examples. It should be understood that these examples are only used to illustrate the present disclosure and are not intended to limit the scope of the present disclosure.

As used herein, the term "orthogonal" refers to a molecule (such as an orthogonal tRNA (O-tRNA) and/or an orthogonal aminoacyl tRNA synthetase (O-RS)) that functions like an endogenous component of the cell, however, its activity is reduced as compared with its corresponding endogenous molecule in the cell or translation system, or it does not function as an endogenous component of the cell. When referring to tRNA and aminoacyl-tRNA synthetases, orthogonal means that the efficiency of cooperation of orthogonal tRNA and endogenous tRNA synthetase is reduced as compared with that of cooperation of endogenous tRNA and endogenous tRNA synthetase, for example decreasing to 20%, 10%, 5%, or 1%, or less. Orthogonal molecules lack the normal function of endogenous complementary molecules within the cell.

As used herein, the term "click reaction" performs the Huisgen [3+2] cyclization of azides and alkynes.

Example 1: Construction of the Expression Plasmid of Site-directedly Mutated MenB Protein 1. Selection of Mutation Site Natural MenB undergoes lipidation modification at its N-terminus. This modification does not affect the three-dimensional structure of the MenB protein, but plays a role in anchoring the protein antigen to cell membrane. Structural studies have shown that the first 20 amino acids at the N-terminal of the MenB protein are not folded to form a secondary structure, but are stretched, and the function is to expose the antigen part through the bacterial outer membrane to the bacterial surface. Therefore, the 20 amino acids at the N-terminal are preferred for the mutation sites, particularly the positions 2-10 are preferred. The information of specific mutation sites is shown in Tables 1-3, wherein the amino acid positions refer to the positions on the sequences shown in SEQ ID NO: 1-3 respectively.

SEQ ID NO. 1:

cgssggggsggggvtadigtgladaltapldhkdkglksltledsisqngtltl-saqgaektygngdslntgklkndkvsrfdfirqi evdgqlitlesgefqvykqshsaltalqteqeqdpehsekmvakrrfrigdi-agehtsfdklpkdvmatyrgtafgsddaggkltytidfa akqghgkiehlk-spelnvdlavayikpdekhhavisgsvlynqdekgsyslgifgekaqevag-saevetangihhiglaakq

SEQ ID NO. 2:

Cgssggggvaadigagladaltapldhkdkslqsltldqsvrkneklklaaq-gaektygngdslntgklkndkvsrfdfirqiev dgqlitlesgefqiykqdh-savvalqiekinnpdkidslinqrsflvsglggehtafnqlpdg-kaeyhgkafssddaggkltytidfaakq ghgkiehlktpeqnvelaaaelkadekshavilgdtrygseekgtyhla-lfgdraqeiagsatvkigekvheigiagkq

SEQ ID NO. 3:

Cgssggggvaadigtgladaltapldhkdkglksltledsisqngtifisaci-
gaektfkvgdkdnslntgklkndkisrfdfvqkie vdgqtit-
lasgefqiykqdhsavvalqiekinnpdkids-
linqrsflvsglggehtafnqlpsgkaeyhgkafssddaggkltytidfaak
qghgkiehlktpeqnvelasaelkadekshavilgdtrygseekgtyhla-
lfgdraqeiagsatvkirekvheigiagkq

TABLE 1

V1.55 mutation sites

| Amino acid position | Amino acid | Codon before mutation | Codon after mutation |
|---|---|---|---|
| 2 | G | GGT | TAG |
| 3 | S | AGC | |
| 4 | S | AGC | |
| 5 | G | GGT | |
| 6 | G | GGT | |
| 7 | G | GGT | |
| 8 | G | GGT | |
| 9 | S | AGT | |
| 10 | G | GGT | |

TABLE 2

V2.16 mutation sites

| Amino acid position | Amino acid | Codon before mutation | Codon after mutation |
|---|---|---|---|
| 2 | G | GGT | TAG |
| 3 | S | AGC | |
| 4 | S | AGC | |
| 5 | G | GGT | |
| 6 | G | GGT | |
| 7 | G | GGT | |
| 8 | G | GGC | |
| 9 | V | GTT | |
| 10 | A | GCA | |

TABLE 3

V3.45 mutation sites

| Amino acid position | Amino acid | Codon before mutation | Codon after mutation |
|---|---|---|---|
| 2 | G | GGT | TAG |
| 3 | S | AGC | |
| 4 | S | AGC | |
| 5 | G | GGT | |
| 6 | G | GGT | |
| 7 | G | GGT | |
| 8 | G | GGC | |
| 9 | V | GTT | |
| 10 | A | GCA | |

2. Acquisition of Expression Plasmids

According to the MenB V.155, V2.16 and V3.45 gene sequences published by NCBI Gene Bank (genbank sequence numbers are AAR84481, AAR84445, AAR84435, respectively corresponding to SEQ ID NO: 1, SEQ ID NO: 2 and SEQ ID NO: 3), the full-length DNA fragments of the genes were obtained by whole gene synthesis respectively, and then respectively fused and constructed between the NcoI and XhoI restriction sites of the pET28a vector; and the C-terminal His purification tag was retained respectively to obtain pET28a-MenB-V1.55, pET28a-MenB-V2.16, and pET28a-MenB-V3.45 expression plasmids.

3. Site-Directed Mutation

The Fast Mutagenesis System site-directed mutation kit from TransGen Biotech Company was used according to its instructions to perform each mutation by using the above pET28a-MenB-V1.55, pET28a-MenB-V2.16 and pET28a-MenB-V3.45 expression plasmids as templates, and using the mutation primer pairs in Tables 4-6. For the plasmids obtained after mutation, sequencing was performed for verification. Sequencing results show that, each mutation site was successfully mutated into TAG, and 9 site-directedly mutated plasmids were obtained.

9 mutant clones of MenB-V1.55 were named as follows:
pET28a-MenB-V1.55-G2, pET28a-MenB-V1.55-53, pET28a-MenB-V1.55-54, pET28a-MenB-V1.55-G5, pET28a-MenB-V1.55-G6, pET28a-MenB-V1.55-G7, pET28a-MenB-V1.55-G8, pET28a-MenB-V1.55-59, pET28a-MenB-V1.55-G10.

9 mutant clones of MenB-V2.16 were named as follows:
pET28a-MenB-V2.16-G2, pET28a-MenB-V2.16-S3, pET28a-MenB-V2.16-S4, pET28a-MenB-V2.16-G5, pET28a-MenB-V2.16-G6, pET28a-MenB-V2.16-G7, pET28a-MenB-V2.16-G8, pET28a-MenB-V2.16-V9, pET28a-MenB-V2.16-A10.

9 mutant clones of MenB-V3.45 were named as follows:
pET28a-MenB-V3.45-G2, pET28a-MenB-V3.45-S3, pET28a-MenB-V3.45-S4, pET28a-MenB-V3.45-G5, pET28a-MenB-V3.45-G6, pET28a-MenB-V3.45-G7, pET28a-MenB-V3.45-G8, pET28a-MenB-V3.45-V9, pET28a-MenB-V3.45-A10.

TABLE 4

Mutation primer pairs for MenB V1.55

| Mutation site | Primer No. | SEQ ID NO: | Primer sequence 5' to 3' |
|---|---|---|---|
| G2 | 12F | SEQ ID NO: 4 | ggagatataccatgggtTGT tag AGCAGCGGTGGTGGTGGTAG |
| | 12R | SEQ ID NO: 5 | CTAACAACCCATGGTATATCTCC |
| S3 | 13F | SEQ ID NO: 6 | gatataccatgggtTGTggt tag AGCGGTGGTGGTGGTAGTGG |
| | 13R | SEQ ID NO: 7 | CTAACCACAACCCATGGTATATC |
| S4 | 14F | SEQ ID NO: 8 | ataccatgggtTGTggtAGC tag GGTGGTGGTGGTAGTGGTGG |
| | 14R | SEQ ID NO: 9 | CTAGCTACCACAACCCATGGTAT |
| G5 | 15F | SEQ ID NO: 10 | ccatgggtTGTggtAGCAGC tag GGTGGTGGTAGTGGTGGCGG |
| | 15R | SEQ ID NO: 11 | CTAGCTGCTACCACAACCCATGG |
| G6 | 16F | SEQ ID NO: 12 | tgggtTGTggtAGCAGCGGT tag GGTGGTAGTGGTGGCGGTGG |
| | 16R | SEQ ID NO: 13 | CTAACCGCTGCTACCACAACCCA |
| G7 | 17F | SEQ ID NO: 14 | gtTGTggtAGCAGCGGTGGT tag GGTAGTGGTGGCGGTGGTGT |
| | 17R | SEQ ID NO: 15 | CTAACCACCGCTGCTACCACAAC |
| G8 | 18F | SEQ ID NO: 16 | GTggtAGCAGCGGTGGTGGT tag AGTGGTGGCGGTGGTGTTAC |
| | 18R | SEQ ID NO: 17 | CTAACCACCACCGCTGCTACCAC |
| S9 | 19F | SEQ ID NO: 18 | gtAGCAGCGGTGGTGGTGGT tag GGTGGCGGTGGTGTTACCGC |
| | 19R | SEQ ID NO: 19 | CTAACCACCACCACCGCTGCTAC |
| G10 | 110F | SEQ ID NO: 20 | GCAGCGGTGGTGGTGGTAGTtagG GCGGTGGTGTTACCGCAGA |
| | 110R | SEQ ID NO: 21 | CTAACTACCACCACCACCGCTGC |

TABLE 5

Mutation primer pairs for MenB V2.16

| Mutation site | Primer No. | SEQ ID NO: | Primer sequence 5' to 3' |
|---|---|---|---|
| G2 | 22F | SEQ ID NO: 22 | ggagatataccatgggtTGT tag AGCAGCGGTGGTGGTGGCGT |
|  | 22R | SEQ ID NO: 23 | CTAACAACCCATGGTATATCTCC |
| S3 | 23F | SEQ ID NO: 24 | gatataccatgggtTGTGGT tag AGCGGTGGTGGTGGCGTTGC |
|  | 23R | SEQ ID NO: 25 | CTAACCACAACCCATGGTATATC |
| S4 | 24F | SEQ ID NO: 26 | ataccatgggtTGTGGTAGC tag GGTGGTGGTGGCGTTGCAGC |
|  | 24R | SEQ ID NO: 27 | CTAGCTACCACAACCCATGGTAT |
| G5 | 25F | SEQ ID NO: 28 | ccatgggtTGTGGTAGCAGC tag GGTGGTGGCGTTGCAGCAGA |
|  | 25R | SEQ ID NO: 29 | CTAGCTGCTACCACAACCCATGG |
| G6 | 26F | SEQ ID NO: 30 | tgggtTGTGGTAGCAGCGGT tag GGTGGCGTTGCAGCAGATAT |
|  | 26R | SEQ ID NO: 31 | CTAACCGCTGCTACCACAACCCA |
| G7 | 27F | SEQ ID NO: 32 | gtTGTGGTAGCAGCGGTGGT tag GGCGTTGCAGCAGATATTGG |
|  | 27R | SEQ ID NO: 33 | CTAACCACCGCTGCTACCACAAC |
| G8 | 28F | SEQ ID NO: 34 | GTGGTAGCAGCGGTGGTGGTtag GTTGCAGCAGATATTGGTGC |
|  | 28R | SEQ ID NO: 35 | CTAACCACCACCGCTGCTACCAC |
| V9 | 29F | SEQ ID NO: 36 | GTAGCAGCGGTGGTGGTGGCtag GCAGCAGATATTGGTGCAGG |
|  | 29R | SEQ ID NO: 37 | CTAGCCACCACCACCGCTGCTAC |
| A10 | 210F | SEQ ID NO: 38 | GCAGCGGTGGTGGTGGCGTTtag GCAGATATTGGTGCAGGTCT |
|  | 210R | SEQ ID NO: 39 | CTAAACGCCACCACCACCGCTGC |

TABLE 6

Mutation primer pairs for MenB V3.45

| Mutation site | Primer No. | SEQ ID NO: | Primer sequence 5' to 3' |
|---|---|---|---|
| G2 | 32F | SEQ ID NO: 40 | ggagatataccatgggtTGT tag AGCAGCGGTGGTGGTGGCGT |
|  | 32R | SEQ ID NO: 41 | CTAACAACCCATGGTATATCTCC |
| S3 | 33F | SEQ ID NO: 42 | gatataccatgggtTGTGGT tag AGCGGTGGTGGTGGCGTTGC |
|  | 33R | SEQ ID NO: 43 | CTAACCACAACCCATGGTATATC |
| S4 | 34F | SEQ ID NO: 44 | ataccatgggtTGTGGTAGC tag GGTGGTGGTGGCGTTGCAGC |
|  | 34R | SEQ ID NO: 45 | CTAGCTACCACAACCCATGGTAT |
| G5 | 35F | SEQ ID NO: 46 | ccatgggtTGTGGTAGCAGC tag GGTGGTGGCGTTGCAGCAGA |
|  | 35R | SEQ ID NO: 47 | CTAGCTGCTACCACAACCCATGG |
| G6 | 36F | SEQ ID NO: 48 | tgggtTGTGGTAGCAGCGGT tag GGTGGCGTTGCAGCAGATAT |
|  | 36R | SEQ ID NO: 49 | CTAACCGCTGCTACCACAACCCA |
| G7 | 37F | SEQ ID NO: 50 | gtTGTGGTAGCAGCGGTGGT tag GGCGTTGCAGCAGATATTGG |
|  | 37R | SEQ ID NO: 51 | CTAACCACCGCTGCTACCACAAC |
| G8 | 38F | SEQ ID NO: 52 | GTGGTAGCAGCGGTGGTGGTtag GTTGCAGCAGATATTGGCAC |
|  | 38R | SEQ ID NO: 53 | CTAACCACCACCGCTGCTACCAC |
| V9 | 39F | SEQ ID NO: 54 | GTAGCAGCGGTGGTGGTGGCtag GCAGCAGATATTGGCACCGG |
|  | 39R | SEQ ID NO: 55 | CTAGCCACCACCACCGCTGCTAC |
| A10 | 310F | SEQ ID NO: 56 | GCAGCGGTGGTGGTGGCGTTtag GCAGATATTGGCACCGGTCT |
|  | 310R | SEQ ID NO: 57 | CTAAACGCCACCACCACCGCTGC |

Example 2: Lys-Azido Incorporation Expression and Purification of the Mutation Protein The expression plasmid vectors pET28a-MenB-V1.55-G2, pET28a-MenB-V2.16-S3 and pET28a-MenB-V3.45-S4 obtained in Example 1 were cultured in LB medium at 37° C. for 12-16 hours, performing secondary amplification to reach 0.6-1.0 of OD value of the bacterial solution, adding Lys-azido to a final concentration of 1 mM, and continuing the amplification at 37° C. for 30 minutes, then adding IPTG to a final concentration of 0.5 mM, and arabinose to a final concentration of 0.2%; cells were collected after induced expression at 24° C. for 12 hours.

The collected cells were balanced and resuspended with Ni-NTA-Bind-Buffer, then ultrasonically disrupted and centrifuged to remove cell debris, performing Ni-NTA metal chelate affinity chromatography, fully washing with Ni-NTA-Wash-Buffer, and finally eluting with Ni-NTA-Elute-Buffer to obtain primary purified protein samples pET28a-MenB-V1.55-G2, pET28a-MenB-V2.16-S3, and pET28a-MenB-V3.45-S4 having a purity of about 90%.

Other mutant proteins of V1.55, V2.16 and V3.45 were also prepared according to the above methods, but due to space limitations, not all of them are described in the description of this disclosure.

Example 3: Synthesis of Tripalmitoyl-S-glyceryl Cysteine Analogue 8

The synthetic route of tripalmitoyl-S-glyceryl cysteine analogue 8 is as follows:
1. Compound 1 (5 g) and 2,2-dimethoxypropane (5 g) were dissolved in dichloromethane (100 ml). After the dissolution is complete, PTSA (0.9 g) was slowly added in the solution in ice-water bath. After the addition is complete, the ice bath was removed to stir at room temperature for 2 hours. After the reaction, the solvent was distilled off under reduced pressure, and Compound 2 was obtained by purification with silica gel chromatography column.
2. Compound 2 (5 g) was dissolved in DMF (100 ml), adding EDCI (5 g), HOBT (3.5 g), TEA (10 g) in sequence to stir for 3-5 minutes, then adding Compound a (6 g); after the addition, the solution was placed in an oil bath at 80° C. to react overnight. After the reaction, the solvent was distilled off under reduced pressure, and Compound 3 was obtained by purification with silica gel chromatography column.
3. Compound 3 (5 g) was dissolved in dichloromethane (100 ml). After the dissolution was complete, 1N HCl methanol solution (20 ml) was added to the system to stir at room temperature for 3 hours. After the reaction, the solvent was distilled off under reduced pressure, and Compound 4 was obtained by purification with silica gel chromatography column.

4. Compound 4 (5 g) was dissolved in DMF (100 ml). After the dissolution was complete, adding triphenyl-chlorosilane (8 g) and imidazole (1 g) to the system in sequence to stir overnight at 40° C. After the reaction, the solvent was distilled off under reduced pressure, and compound 5 was obtained by purification with silica gel chromatography column.

5. Compound 5 (5 g) and Compound b (6 g) were dissolved in DMF (100 ml), adding molecular sieves (10 g) at the same time, then adding 3-5 drops of concentrated sulfuric acid to place in an oil bath at 80° C. to react overnight. After the reaction, the molecular sieves were removed by filtration, the solvent was distilled off under reduced pressure, and Compound 6 was obtained by purification with silica gel chromatography column.

6. Compound 6 (5 g) was dissolved in acetic acid (100 ml). After the dissolution was complete, the solution was refluxed at 120° C. for 6 h. The reaction process was monitored by TLC. After the reaction of the raw materials was completed, the solvent was distilled off under reduced pressure, and Compound 7 was obtained by purification with silica gel chromatography column.

7. Compound 7 (5 g) and Compound c (6 g) were dissolved in DMF (100 ml), adding molecular sieves (10 g) at the same time, then adding 3-5 drops of concentrated sulfuric acid to place in an oil bath at 80° C. to react overnight. After the reaction, the molecular sieves were removed by filtration, the solvent was distilled off under reduced pressure, and Compound 8 was obtained by purification with silica gel chromatography column.

The flow chart is as follows:

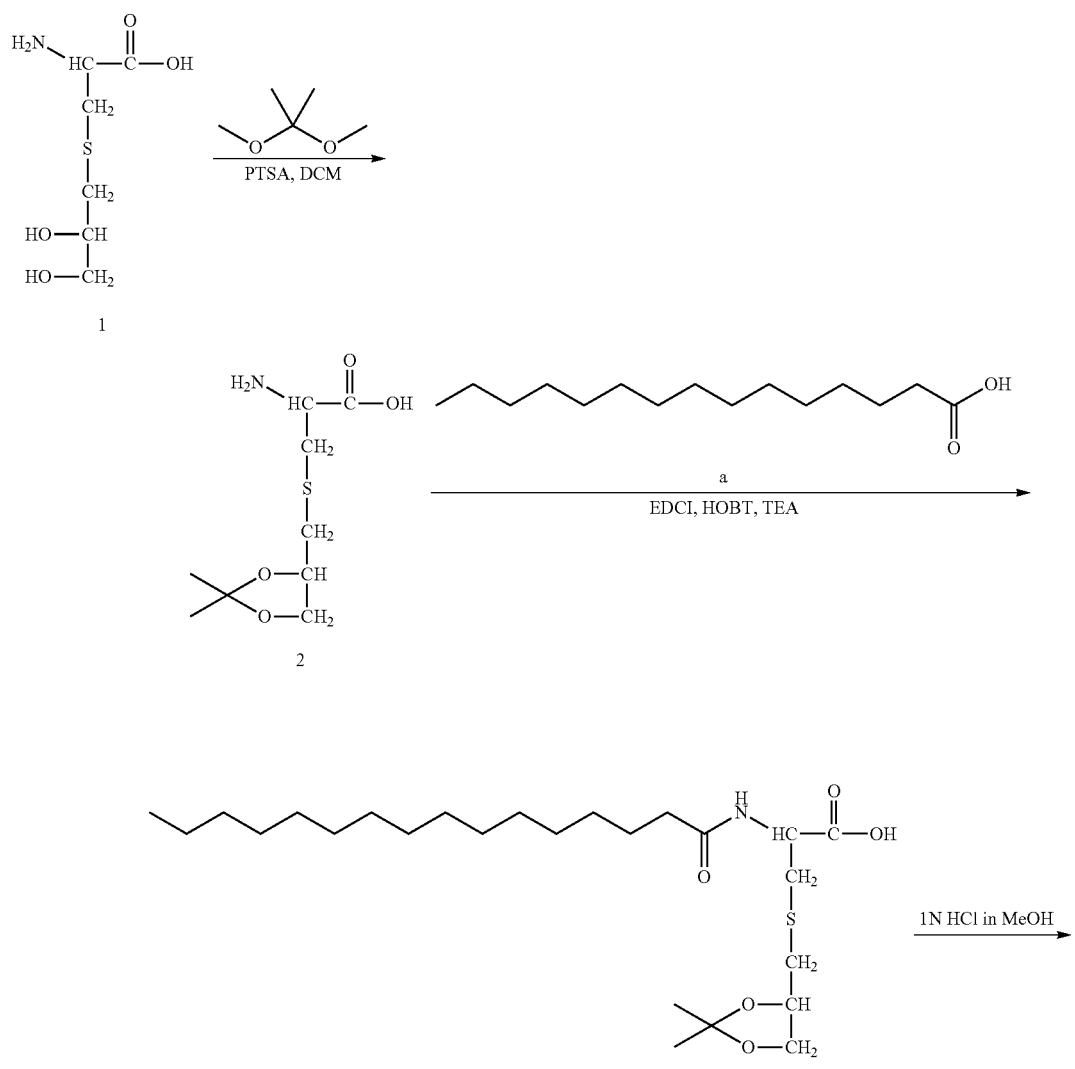

-continued
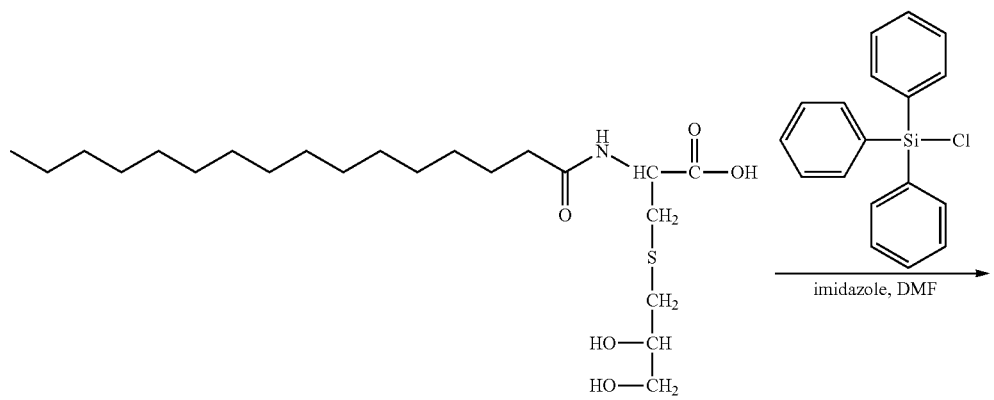
4
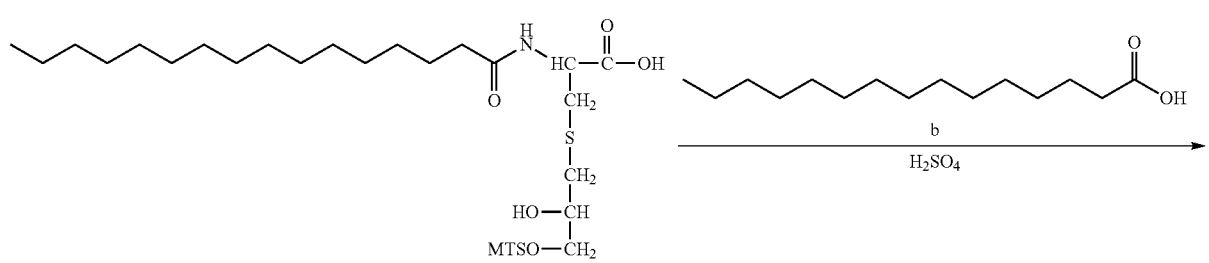
5
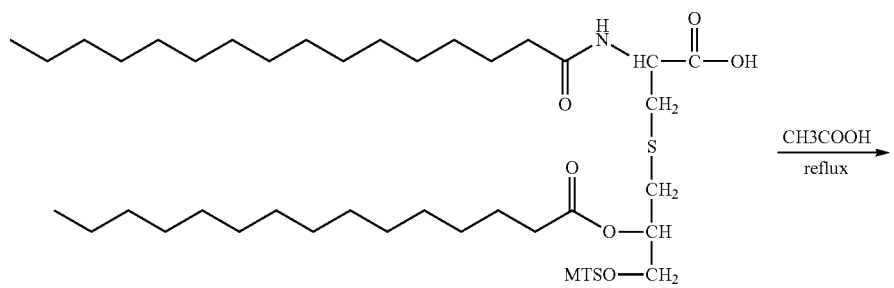
6
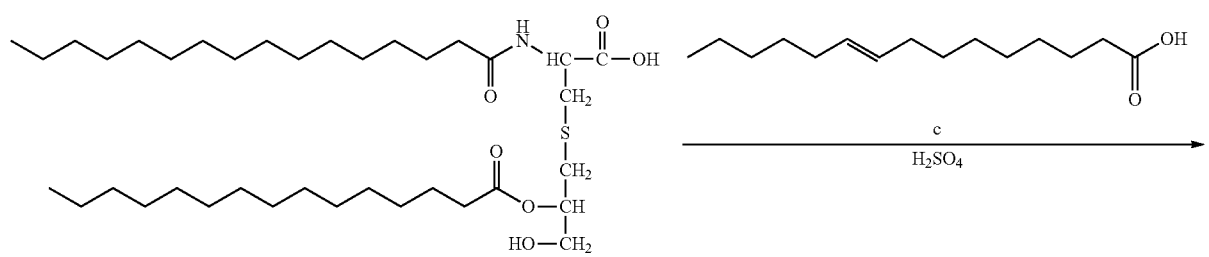
7

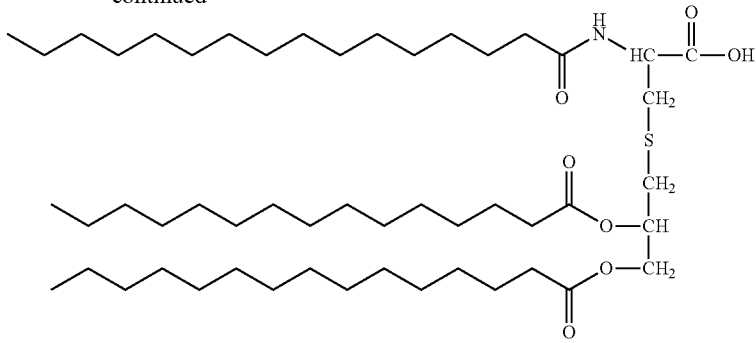
8
Using the same method, other analogues L1-L15 of tripalmitoyl-S-glyceryl cysteine may be obtained:
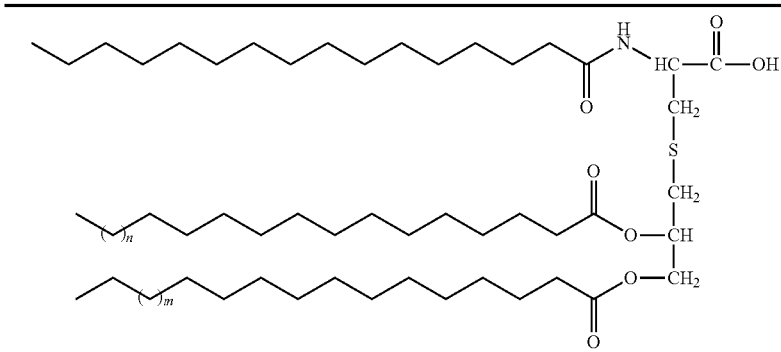
| No. | L1 | L2 | L3 | L4 | L5 |
|---|---|---|---|---|---|
| m | 1 | 2 | 3 | 4 | 5 |
| n | 1 | 2 | 3 | 4 | 5 |
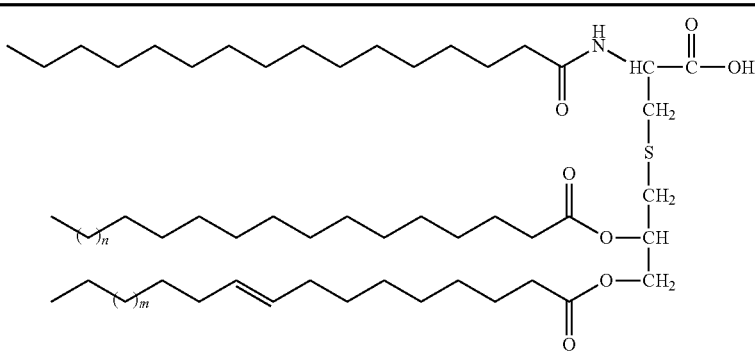
| No. | L6 | L7 | L8 | L9 | L10 |
|---|---|---|---|---|---|
| m | 1 | 2 | 3 | 4 | 5 |
| n | 1 | 2 | 3 | 4 | 5 |

| No. | L11 | L12 | L13 | L14 | L15 |
|---|---|---|---|---|---|
| m | 1 | 2 | 3 | 4 | 5 |
| n | 1 | 2 | 3 | 4 | 5 |

Example 4: Coupling of Mutant Protein pET28a-MenB-V1.55-G2 with Tripalmitoyl-S-Glyceryl Cysteine Analogue Via Copper-Catalyzed Click Reaction The reaction system is as follows:

| | |
|---|---|
| pET28a-MenB-V1.55-G2 protein | 1 μg/μl |
| Tripalmitoyl-S-glyceryl cysteine Compound 8 | 20 μg/μl |
| $Cu^{2+}$ | 1 mM |
| BTTES | 400 μmol |
| PBS | 0.01M (pH ≈ 7) |
| Cu wire segment | Sufficient |

Note:
(1,2,3-triazol-1-yl)ethanesulfonic acid, referred to as BTTES)

Reaction conditions: 4° C., vertical suspension for 30 minutes, after the reaction was completed, EDTA was added to 1 mM to terminate the reaction to obtain a final product, i.e., a site-directedly coupling conjugate MenB-V1.55-G2-L1 of tripalmitoyl-S-glyceryl cysteine analogue and pET28a-MenB-V1.55-G2 protein.

Example 5: Coupling of Mutant Protein pET28a-MenB-V2.16-S3 with Tripalmitoyl-S-Glyceryl Cysteine Analogue Via Copper-Catalyzed Click Reaction With the same operation steps as in Example 4, a site-directedly coupling conjugate MenB-V2.16-S3-L1 of tripalmitoyl-S-glyceryl cysteine analogue and pET28a-MenB-V2.16-S3 protein was obtained.

Example 6: Coupling of Mutant Protein pET28a-MenB-V3.45-S4 with Tripalmitoyl-S-Glyceryl Cysteine Analogue Via Copper-Catalyzed Click Reaction With the same operation steps as in Example 4, a site-directedly coupling conjugate MenB-V3.45-S4-L1 of tripalmitoyl-S-glyceryl cysteine analogue and pET28a-MenB-V3.45 protein was obtained.

According to the method of Examples 4-6, site-directedly coupling conjugates of a protein with different liposomes were simultaneously prepared, as shown in the following table:

MenB-V1.55-G2-L2
MenB-V2.16-S3-L2
MenB-V3.45-S4-L2
MenB-V1.55-G2-L11
MenB-V2.16-S3-L11
MenB-V3.45-S4-L11
MenB-V1.55-G2-L15
MenB-V2.16-S3-L15
MenB-V3.45-S4-L15
MenB-V1.55-G2-L12
MenB-V2.16-S3-L12
MenB-V3.45-S4-L12
MenB-V1.55-G2-L14
MenB-V2.16-S3-L14
MenB-V3.45-S4-L14
MenB-V1.55-S3-L1
MenB-V2.16-S3-L1
MenB-V3.45-S4-L1
MenB-V1.55-S4-L2
MenB-V2.16-S4-L2
MenB-V3.45-S4-L2
MenB-V1.55-G5-L6
MenB-V2.16-G5-L6
MenB-V3.45-S4-L6
MenB-V1.55-G6-L11
MenB-V2.16-G6-L11
MenB-V3.45-S4-L11
MenB-V1.55-G7-L15
MenB-V2.16-G7-L15
MenB-V3.45-S4-L15
MenB-V1.55-G8-L1
MenB-V2.16-G8-L1
MenB-V3.45-S4-L1
MenB-V1.55-S9-L2
MenB-V2.16-G2-L2
MenB-V3.45-S4-L1
MenB-V1.55-G10-L1
MenB-V2.16-V9-L2
MenB-V3.45-S4-L3

Example 7: Preparation of Trivalent fHBP Protein Vaccine

Three mutants were selected from the mutated proteins with modification prepared in this disclosure, and the three mutant recombinant group B fHBP lipoproteins MenB-V1.55-G2-L1, MenB-V2.16-S3-L1, MenB-V3.45-S4-L1 were adsorbed with aluminum hydroxide adjuvant respectively, stirring overnight at 4° C., and the adsorption rate was above 95%. The protein vaccine was prepared by diluting with 0.15 mol/l sodium chloride, until the final concentration of the protein is 240 µg/ml. The final concentration of aluminum is 0.45-0.6 mg/ml, and the pH value is 5.8-7.2.

Example 8: The Bactericidal Activity (SBA) Test of Popular Strains

The strain of group B meningococcus 440902 was used. The strain belongs to ST4821 sequence type and ST4821 sequence group, and is a recent epidemic strain of group B meningococcus in China, and the fHBP typing is a V2 variant.

Preparation of target bacteria: epidemic meningococcus 440902 strain was cultured on 8-12% blood-nourishing agar plate at 37° C., 6-10% $CO_2$ for 16-18 hours, scraping bacterial lawn into normal saline, and counting the bacteria by turbidimetric method; the target bacteria were diluted to $1 \times 10^6$ according to the count.

The mouse serum to be tested was inactivated at 56° C. for 1 hour to inactivate the intrinsic complement activity of the mouse serum. During the experiment, the Pel-Freez young rabbit complement was added to the serum of the mouse to be tested, and the inactivated complement and complement control were set at the same time, performing doubling dilution to a 96-well culture plate, and dropwise adding 10 µm freshly prepared target bacteria to shake and mix well, then incubating at 37° C. for 2-4 hours.

Sample application: after culturing, the mixed bacterial solution was taken to dropwise add to a solid nutrient agar comprehensive medium in an amount of 10 ml, incubating overnight at 37° C., 5% $CO_2$.

Color development: the soft agar comprising 150-300 µg/ml TTC was plated on the solid nutrient agar comprehensive medium cultured overnight, developing color at an appropriate temperature and appropriate time.

Counting: high-definition photos of colored colonies were taken, using image scanning technology, and analyzing with proprietary analysis software to count the number of bacterial colonies; bactericidal titer was calculated with the bactericidal activity calculation software, and the results are as follows:

Mouse Serum Bactericidal Titer

| Strain 440902 | MenB-V1.55-G2-L1 | MenB-V2.16-S3-L1 | MenB-V3.45-S4-L1 | Trivalent fHBP | Normal saline |
|---|---|---|---|---|---|
| Bactericidal titer | 26 ± 1.5 | 1373 ± 52.3 | 458 ± 15.1 | 1420 ± 67.1 | 2.2 ± 0.1 |

Example 9: Bactericidal Activity (SBA) Test Results of Other Conjugates

| Site-directedly coupling conjugate | Bactericidal titer (Strain 440902, V2) | Bactericidal titer (Strain H44/76, V1) |
|---|---|---|
| MenB-V1.55-G2-L2 | 25 ± 1.3 | 800 ± 13 |
| MenB-V2.16-S3-L2 | 1342 ± 55.1 | 20 ± 5.1 |
| MenB-V3.45-S4-L2 | 451 ± 18.1 | 11 ± 1.1 |
| MenB-V1.55-G2-L11 | 27 ± 1.3 | 1000 ± 13 |
| MenB-V2.16-S3-L11 | 1360 ± 52.1 | 30 ± 5.1 |
| MenB-V3.45-S4-L11 | 431 ± 28.1 | 116 ± 1.1 |
| MenB-V1.55-G2-L15 | 23 ± 1.6 | 950 ± 13 |
| MenB-V2.16-S3-L15 | 1337 ± 47.1 | 20 ± 5.1 |
| MenB-V3.45-S4-L15 | 437 ± 28.4 | 12 ± 1.1 |
| MenB-V1.55-G2-L12 | 27 ± 4.3 | 890 ± 13 |
| MenB-V2.16-S3-L12 | 1357 ± 43.3 | 22 ± 5.1 |
| MenB-V3.45-S4-L12 | 433 ± 22.4 | 17 ± 1.1 |
| MenB-V1.55-G2-L14 | 30 ± 2.3 | 1220 ± 13 |
| MenB-V2.16-S3-L14 | 1331 ± 33.7 | 20 ± 5.1 |
| MenB-V3.45-S4-L14 | 418 ± 22.4 | 11 ± 1.1 |
| MenB-V1.55-S3-L1 | 19 ± 6.3 | 980 ± 13 |
| MenB-V2.16-S3-L1 | 1361 ± 23.7 | 20 ± 5.1 |
| MenB-V3.45-S4-L1 | 397 ± 22.4 | 11 ± 1.1 |
| MenB-V1.55-S4-L2 | 33 ± 6.1 | 1060 ± 13 |
| MenB-V2.16-S4-L2 | 1412 ± 33.4 | 20 ± 5.1 |
| MenB-V3.45-S4-L2 | 503 ± 28.3 | 11 ± 1.1 |
| MenB-V1.55-G5-L6 | 23 ± 5.1 | 860 ± 13 |
| MenB-V2.16-G5-L6 | 1452 ± 23.4 | 20 ± 5.1 |
| MenB-V3.45-S4-L6 | 443 ± 26.3 | 11 ± 1.1 |
| MenB-V1.55-G6-L11 | 31 ± 3.1 | 1220 ± 13 |
| MenB-V2.16-G6-L11 | 1312 ± 33.1 | 20 ± 5.1 |
| MenB-V3.45-S4-L11 | 403 ± 21.3 | 11 ± 1.1 |
| MenB-V1.55-G7-L15 | 22 ± 3.1 | 1550 ± 13 |
| MenB-V2.16-G7-L15 | 1512 ± 22.7 | 20 ± 5.1 |
| MenB-V3.45-S4-L15 | 393 ± 24.5 | 11 ± 1.1 |
| MenB-V1.55-G8-L1 | 40 ± 3.1 | 1020 ± 13 |
| MenB-V2.16-G8-L1 | 1292 ± 22.7 | 20 ± 5.1 |
| MenB-V3.45-S4-L1 | 473 ± 19.7 | 11 ± 1.1 |
| MenB-V1.55-S9-L2 | 24 ± 3.1 | 1300 ± 13 |
| MenB-V2.16-G2-L2 | 1492 ± 30.1 | 20 ± 5.1 |
| MenB-V3.45-S4-L1 | 413 ± 22.6 | 11 ± 1.1 |
| MenB-V1.55-G10-L1 | 29 ± 3.6 | 1700 ± 13 |
| MenB-V2.16-V9-L2 | 1502 ± 20.8 | 20 ± 5.1 |
| MenB-V3.45-S4-L3 | 393 ± 22.1 | 11 ± 1.1 |
| MenB-V1.55-G10 (non-lipidation) | 29 ± 3.6 | 260 ± 13 |
| MenB-V2.16-V9 (non-lipidation) | 302 ± 2.8 | 20 ± 5.1 |
| MenB-V3.45-S4 (non-lipidation) | 20 ± 21.1 | 11 ± 1.1 |
| Normal saline | 2.2 ± 0.1 | 2.2 ± 0.1 |

The above test results of bactericidal activity of different site-directedly coupling conjugates show that:

1. The lipoproteins obtained by site-directedly coupling V1 and V2 variants of MenB protein with liposome has significant bactericidal activity as compared with normal saline in the negative control group, and has no significant difference in bactericidal activity as compared with the trivalent fHBP positive control group;
2. The lipoproteins obtained by site-directedly coupling V1, V2 and V3 variants of MenB protein with liposome has significant increased bactericidal activity as compared with the non-lipidated protein without liposome modification;
3. The V3 variant lipoprotein of MenB protein has a certain cross-protection effect on V2 strain.

This result shows that the liposome obtained by chemical synthesis in the present disclosure may be site-directedly coupled with MenB protein to obtain a lipoprotein with clear structure, uniform composition, controllable quality and high antigenic activity; and the product effectiveness and safety may be further improved by accurately controlling and adjusting the effective dosage.

Example 10: Acute Toxicity and Abnormal Toxicity Test

This test utilizes the drug acute toxicity reaction of different doses, and certain dosage of testing solution (a trivalent group B meningococcal protein vaccine formed by MenB-V1.55-G2-L1, MenB-V2.16-S3-L1 and MenB-V3.45-S4-L1 prepared in Examples 4-6) was injected into the test animals (mice, guinea pigs), observing the symptoms of toxic reactions and death in the animals within a specified time, and judging whether the test product meets the specified quality requirements and the safety degree.

Experimental method: NIH mice, body weight: 18-22 g/mouse, 5 animals in each group; guinea pigs, body weight: 250-350 g/mouse, 2 animals in each group;

Injection Dose and Grouping

Abnormal toxicity test: the inoculation dose specified in the abnormal toxicity inspection method of item XIIF in the appendix of volume 3 of "Chinese Pharmacopoeia" (2015 edition) was adopted: mice, intraperitoneal injection of 0.5 ml (1 human dose); guinea pigs, intraperitoneal injection of 5 ml (10 human doses).

Repeated dosing test: after administration according to the above test, the tested animals were observed that no abnormal symptoms appeared within three days, continuing to raise until day 7, and the tested animals were healthy, normal with weight again; then the above doses were given repeatedly to continue to observe for 7 days to judge the result.

Acute toxicity test: 5 times of the inoculation dose specified in the abnormal toxicity inspection method of item XIIF in the appendix of volume 3 of "Chinese Pharmacopoeia" (2015 edition) was adopted, and a concentrated vaccine was prepared by various monovalent group B meningococcal protein stock solution; the dosage is as follows: mice, intraperitoneal injection of 0.5 ml (5 human doses), guinea pigs, intraperitoneal injection of 5 ml (50 human doses).

Judgment of Experimental Results

After the mice and guinea pigs were inoculated with the test product, they were observed continuously for 7 days. During the observation period, all the animals may be healthy and alive without any abnormal reaction. When the time expired, the weight of the animals were increased, and the test product was judged to be qualified.

Test Results

Abnormal Toxicity and Acute Toxicity Test of Trivalent Group B Meningococcal Protein Vaccine Result Analysis Regardless of the abnormal toxicity of the normal dose, the repetitive dosing of the normal dose, and the acute toxicity test of 5 times the normal dose, after the inoculation, the animals in each group moved and ate normally without abnormal reactions, and all survived and gained weight. The tests confirm that the test product has reliable safety. It shows that the abnormal toxicity and acute toxicity tests of the trivalent group B meningococcal protein vaccine are qualified.

Conclusion: The abnormal toxicity and acute toxicity tests of the trivalent group B meningococcal protein vaccine provided by the present invention are qualified.

Figure 2:
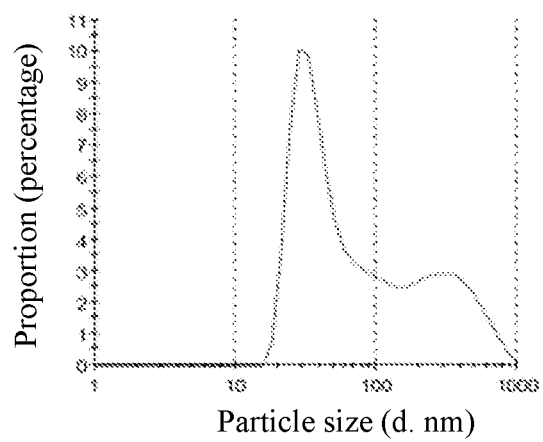
Figure 3:
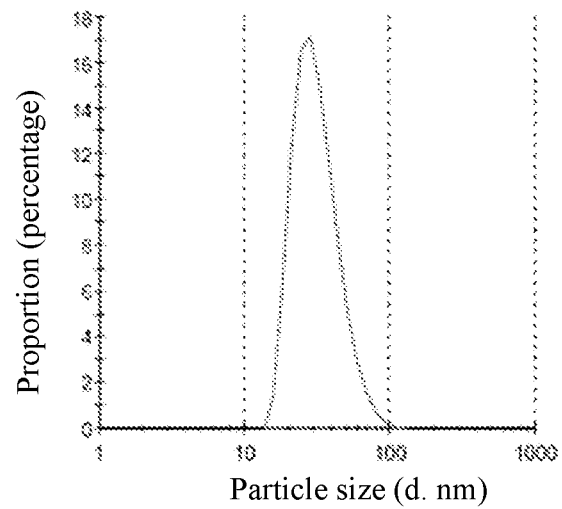
Figure 4:
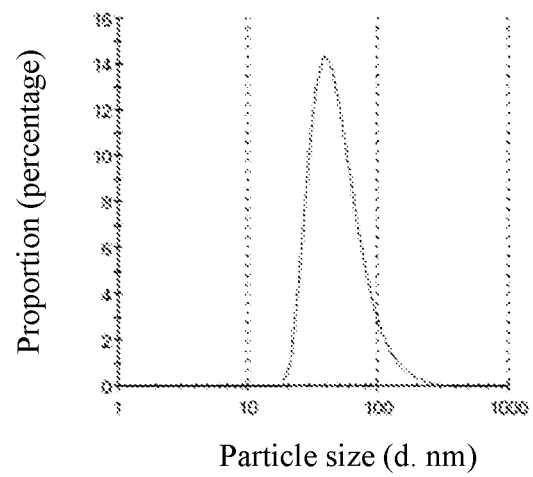
Figure 5:
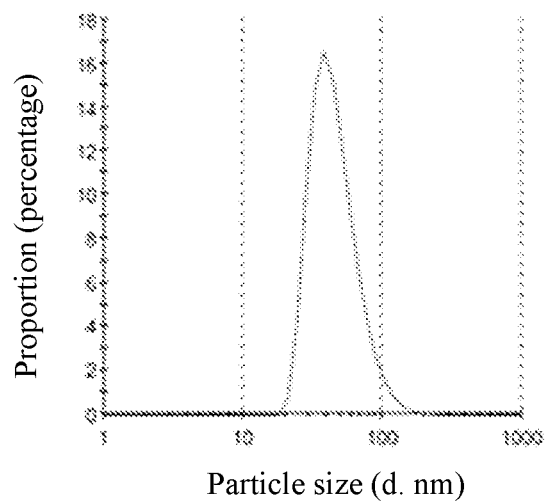

Example 11: Comparison on the Particle Size Analysis of Site-Directedly Modified Lipoprotein and Wild-Type Lipoprotein The size distribution of each lipoprotein MenB-V1.55-G2-L1, MenB-V2.16-S3-L1, and MenB-V3.45-S4-L1 was analyzed by using Dynamic Light Scattering (DLS) and Zetasizer Nano ZS. The lipoproteins obtained by site-directedly modifying and coupling the proteins has uniform particle size distribution, and good product uniformity; while the wild-type lipoproteins MenB-V1.55 and MenB-V2.16 obtained by traditional fermentation have uneven particle size distribution and aggregates. Referring to FIGS. 1-5, FIG. 1 is a diagram of the particle size of the MenB-V1.55 protein, including two main particle size ranges, e.g., about 20 nm and 90 nm respectively. FIG. 2 is a diagram of the particle size of MenB-V2.16 protein, including two main particle size ranges, e.g., about 30 nm and 400 nm respectively; FIG. 3 is a diagram of the particle size of MenB-V1.55-G2-L1 protein, the main particle size range of about 50 nm. FIG. 4 is a particle size diagram of MenB-V2.16-S3-L1 protein, and the main particle size range is about 60 nm. FIG. 5 is a diagram of the particle size of MenB-V2.16-S3-L1 protein, the main particle size range is about 50 nm.

In summary, the site-directedly modified lipoproteins obtained in this disclosure have consistent liposome length and significantly controllable quality, which can effectively avoid the disadvantage of heterogeneous lipidation in the

| | | Grouping | | | | | |
|---|---|---|---|---|---|---|---|
| | | Abnormal toxicity (normal dose) | | Repetitive dosing (normal dose) | | Acute toxicity (5 times of normal dose) | |
| | | Mouse | Guinea pig | Mouse | Guinea pig | Mouse | Guinea pig |
| Injection | | Before After | Before After | Before After | Before After | Before After | Before After |
| Body weight (g), and No. | 1 | 19.2  23.1 | 300  322 | 19.3  23.3 | 303  325 | 19.4  23.2 | 310  352 |
| | 2 | 19    22.8 | 309  341 | 19.1  23   | 312  341 | 19.2  22.9 | 322  349 |
| | 3 | 20.2  23.8 | /    /   | 20.3  24   | /    /   | 20.4  23.9 | /    /   |
| | 4 | 18.5  24   | /    /   | 18.6  24.2 | /    /   | 18.7  24.1 | /    /   |
| | 5 | 20.1  22.9 | /    /   | 20.2  23.1 | /    /   | 20.3  23   | /    /   |
| Animal condition during observation | | Eating, normal activity, no abnormality | | No abnormality after first injection, normal activity after injection again | No abnormality after first injection, normal activity after injection again | Eating, normal activity, no abnormality | | expression process of recombinant lipoproteins, thereby ensuring immunogenicity and significantly reducing the degree of side effects.

Although the preferred examples are disclosed above in the present disclosure, they are not used to limit the claims. Any person skilled in the art may make some possible changes and modifications without departing from the concept of the present disclosure. Therefore, the protection scope of present disclosure should be based on the scope defined by the claims of the present disclosure.

What is claimed is:

1. A conjugate of a site-directedly mutated group B meningococcal fHBP protein, wherein the conjugate is formed by coupling a site-directedly mutated protein with a modification compound, and the modification compound is a TLR2 receptor agonist;

the site-directedly mutated protein is selected from: variants 2 and 3 in subfamily A or variant 1 in subfamily B of B meningococcal fHBP proteins, and the amino acid of at least one site on the protein is mutated into an unnatural amino acid;

the mutation site is selected from: amino acids in the amino acid sequence of positions 2-10 in SEQ ID NO: 1, amino acids in the amino acid sequence of positions 2-10 in SEQ ID NO: 2, amino acids in the amino acid sequence of positions 2-10 in SEQ ID NO: 3;

the amino acid at the mutation site of the site-directedly mutated protein is coupled with the modification compound to form the following structure:

-continued
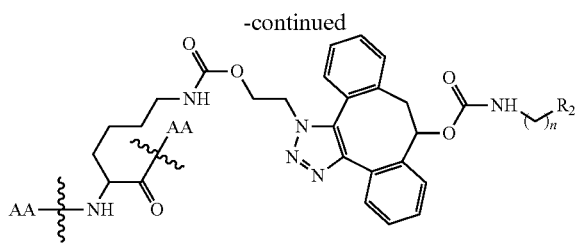

Wherein, AA is an amino acid before or after the mutation site, n=1-20, and R2 is a TLR2 receptor agonist.

2. The conjugate according to claim 1, wherein $R_2$ is selected from: tripalmitoyl-S-glyceryl cysteine, monophosphorylate lipid A, dipalmitoyl-S-glyceryl-cysteine, or a functionally active analogue thereof.

3. The conjugate according to claim 2, wherein $R_2$ is a tripalmitoyl-S-glyceryl cysteine analogue, and is selected from a functionally active analogue of the following structural formula:

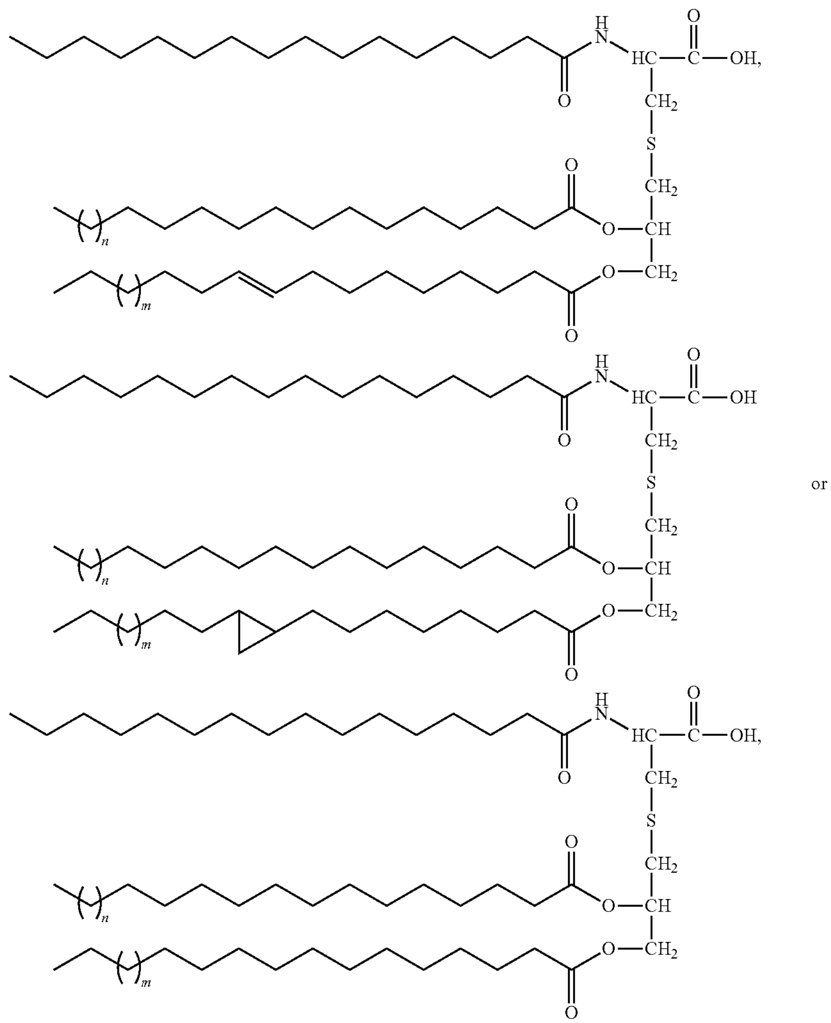

wherein n, m=1-5.

4. The conjugate according to claim 1, wherein the molar ratio of the group B meningococcal fHBP protein to the modification compound in the conjugate is 1:1-30.

* * * * *